United States Patent
Weihrauch

(10) Patent No.: US 6,357,074 B1
(45) Date of Patent: Mar. 19, 2002

(54) CLEANING BRUSH, ESPECIALLY A TOOTHBRUSH

(75) Inventor: Georg Weihrauch, Wald-Michelbach (DE)

(73) Assignee: CORONET-Werke GmbH, Wald-Michelbach (DE)

( * ) Notice: Subject to any disclaimer, the term of this patent is extended or adjusted under 35 U.S.C. 154(b) by 0 days.

(21) Appl. No.: 09/582,678

(22) PCT Filed: Apr. 7, 1999

(86) PCT No.: PCT/EP99/02342

§ 371 Date: Jun. 29, 2000

§ 102(e) Date: Jun. 29, 2000

(87) PCT Pub. No.: WO99/52395

PCT Pub. Date: Oct. 21, 1999

(30) Foreign Application Priority Data

Apr. 9, 1998 (DE) .......................................... 198 16 098

(51) Int. Cl.[7] .................................................. A46B 9/04
(52) U.S. Cl. ........................................ 15/167.1; 15/172
(58) Field of Search ............................... 15/167.1, 172; D4/104

(56) References Cited

U.S. PATENT DOCUMENTS

| 1,327,807 A | * | 1/1920 | Burleigh |
| 2,445,657 A | | 7/1948 | Bennet |
| 5,373,602 A | | 12/1994 | Bang |
| 5,946,758 A | * | 9/1999 | Hohlbein |
| 6,101,659 A | * | 8/2000 | Halm |

FOREIGN PATENT DOCUMENTS

| DE | 35 10 909 | | 10/1986 |
| DE | 42 02 312 | | 8/1993 |
| DE | 195 30 057 | | 2/1997 |
| EP | 0 310 482 | | 4/1989 |
| EP | 0 758 534 | | 2/1997 |
| JP | 10 033 261 | | 2/1998 |
| WO | WO 92 17 093 | | 10/1992 |
| WO | WO 96 02 165 | | 2/1996 |
| WO | WO 97 07 707 | | 3/1997 |
| WO | WO98/27847 | * | 7/1998 |

* cited by examiner

Primary Examiner—Terrence R. Till
(74) Attorney, Agent, or Firm—Paul Vincent

(57) ABSTRACT

A cleaning brush, particularly toothbrush, has a handle and an elongated brush head, which comprises a flexible bristle carrier tapering in longitudinal cross-section from the handle to the front end of the brush head and bristles fixed thereto. The bristle carrier is formed from two longitudinally, successively arranged portions interconnected in transitionless manner and made from materials having differing characteristics and at least the front portion is made from an elastomer. The materials, cross-sections and bending length of the portions are so chosen that the front portion is deflectable with a smaller radius of curvature than the other portion.

15 Claims, 3 Drawing Sheets

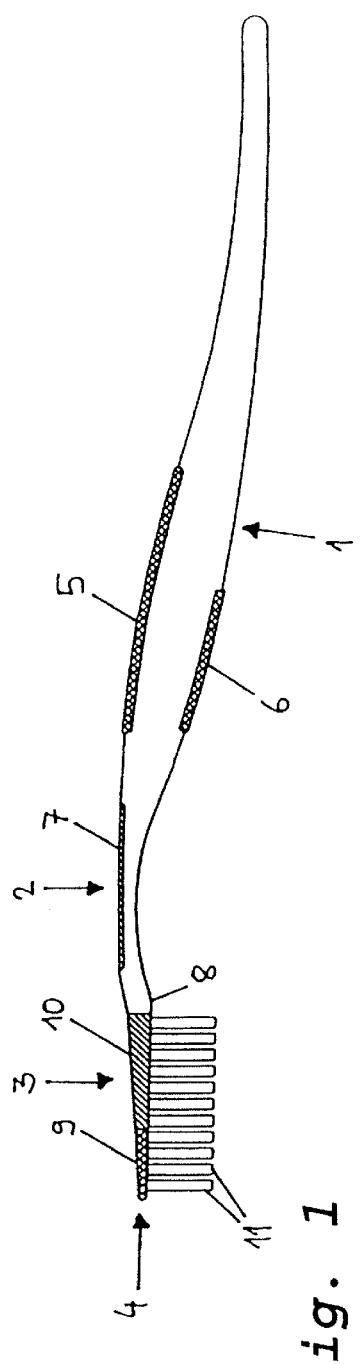
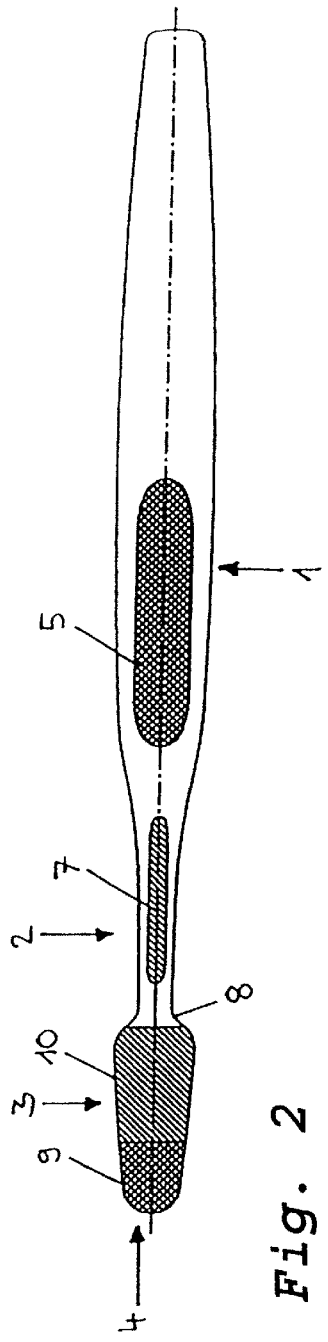
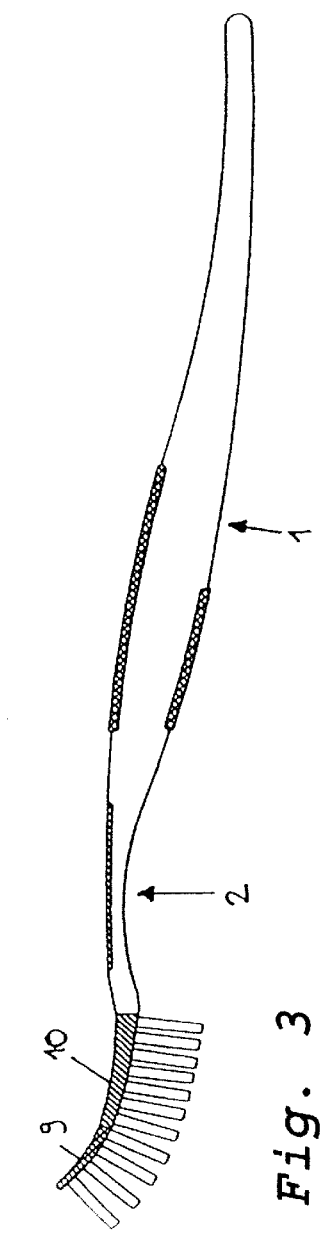
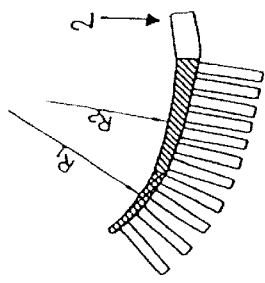
Fig. 1
Fig. 2
Fig. 3
Fig. 4

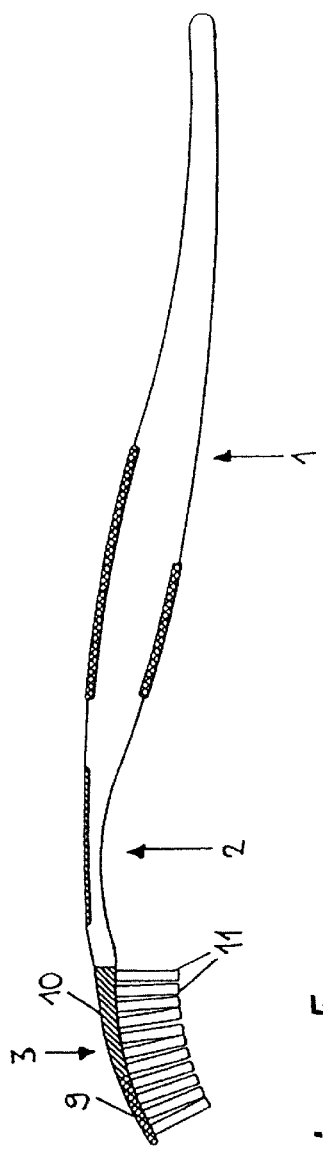
Fig. 5
Fig. 6
Fig. 8
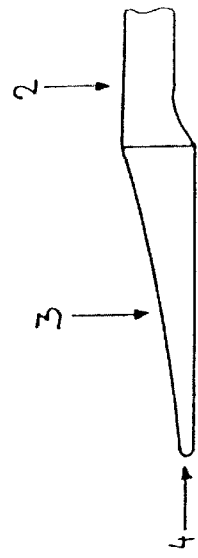
Fig. 7
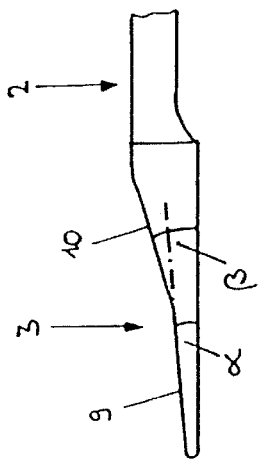
Fig. 9

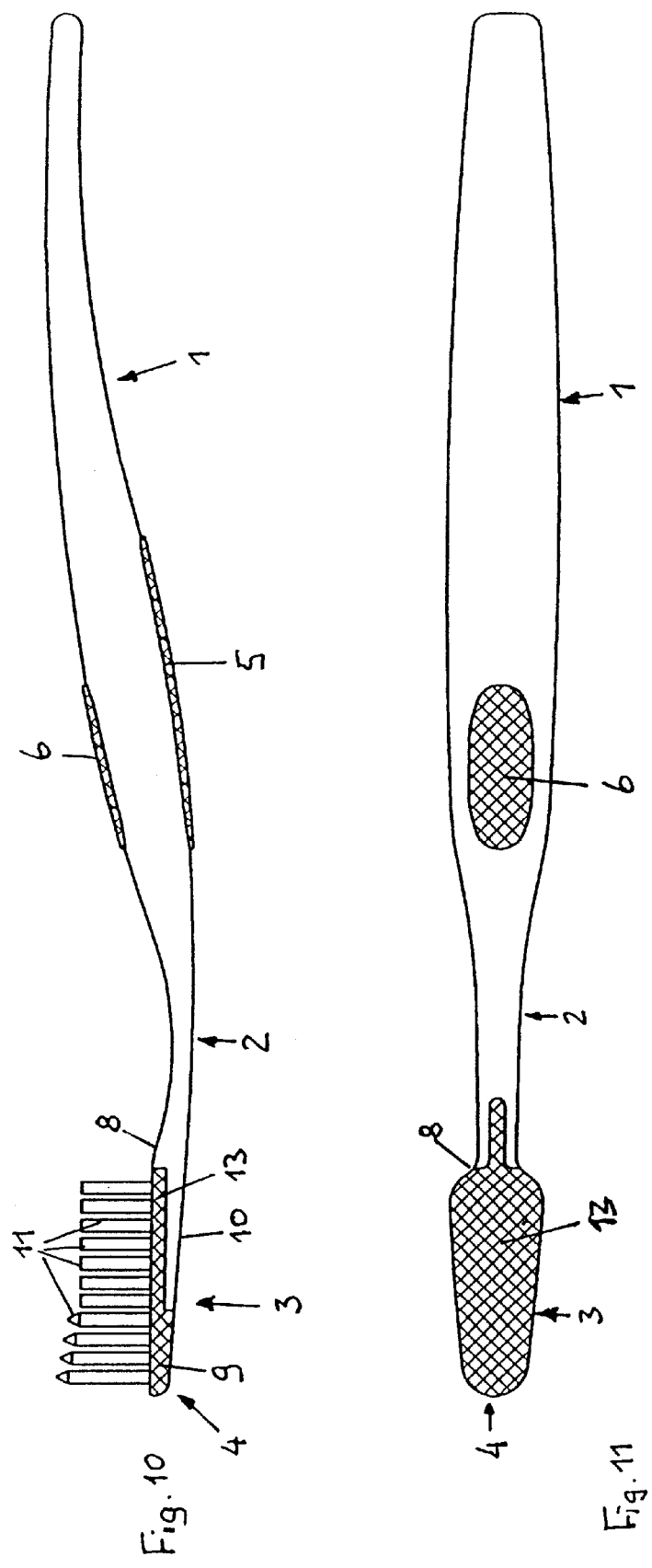

CLEANING BRUSH, ESPECIALLY A TOOTHBRUSH

BACKGROUND OF THE INVENTION

The invention relates to a plastic cleaning brush, particularly a toothbrush, having a handle and an elongated brush head, which comprises a bristle carrier tapering in longitudinal cross-section from the handle to the front end of the brush head and bristles fixed thereto, where on exceeding a given pressure of the bristles on the surface to be cleaned, the bristle carrier can be deflected in an elastically flexible manner.

Conventional toothbrushes, whose handle and brush head and optionally a tapering neck interposed between them are injection molded in one piece from plastic and whose brush head is covered with bristle bundles, as a function of the dimensioning of the cross-sections and the choice of the plastics material have a certain elasticity, which cannot meet the special requirements in connection with tooth and mouth care. These special requirements are constituted by the differing outer contour of teeth with convex outer faces and concave inner faces to which it is not possible for a rigid brush head to adapt. In addition, discontinuities exist in the tooth contours due to the interdental spaces and the latter are only reached by the bristles if on the one hand the bristles have an adequate elasticity in order to evade on the free tooth faces and on the other the pressure of the brush head is sufficiently high. In addition, the toothbrush and in particular its bristles must be so designed that no local pressure peaks occur, which could lead to injuries on the dental enamel and in particular on the gingiva.

The need for a design adaptation of the toothbrush to these special features have been recognized by the experts. These documents are referred to in the following discussion of the prior art with the reference numerals used in the list.

The toothbrush described in (1) comprises a substantially flexurally stiff handle and a brush head fixed thereto and whose longitudinal cross-section tapers in wedge-shaped manner towards the front end in order to also be able to reach narrow areas of the oral cavity without an excessive bending aside of the bristles. The brush head is made from rubber or some other resilient material and a flexible, steel stiffening rod embedded therein and tapering towards the end of the brush head. The bending behavior of the brush head is exclusively determined by the rod-like insert, because the surrounding rubber sleeve has no significant bending resistance. The insert in conjunction with the pressure applied to the handle determines the pressing action on the teeth to be cleaned or the gums to be massaged. As a result of the tapering of the steel insert there is a spring constant which decreases from the handle to the front end of the brush head and, for a given pressure, a deflection of the bristle carrier receiving the bristles which progressively increases towards the front end of the brush head. As a result of the rod-like construction of the insert this deflection also occurs transversely to the brush longitudinal axis, so that the brush head cannot be guided in a controlled manner. The brush head is connected to the handle by a metal sleeve. Due to this and due to the steel insert there is a costly manufacturing procedure. Moreover, due to the metal parts, the toothbrush does not comply with modern requirements.

Another known construction (2) has a substantially rigid handle, to which is connected by an adhesive joint a brush head made from flexible material, e.g. rubber. The brush head also tapers from the handle to the front end and is curved in concave manner towards the bristles. This is intended to cover the outer contours of the denture in the front tooth area, whereas in the back tooth area the brush head gives way due to its rubber elasticity. Adaptation also results through a deflection to a convex curvature on the bristle side of the inner contour of the teeth. These characteristics cannot or cannot adequately be implemented with a one-piece molding forming the brush head.

In the toothbrush described in (3) the brush head is in two parts. The handle-near area of the bristle carrier is manufactured in one piece with the handle and is not bendable. To the top of the bristle carrier is bonded a rubber elastic portion forming the front part of the brush head and can bend at the leading edge of the rear part of the brush head. This only permits a very incomplete adaptation to the denture contour and also the fatigue strength of the toothbrush is completely inadequate due to the critical compressive and shear forces at the transition between the two brush head parts.

According to numerous other proposals in (4) through (12), the brush head is subdivided into several segments, which are interconnected in integrally joined manner by means of plastic bridges, spring inserts or in mechanical manner, the bristle bundles being fixed to the individual segments. It has been attempted to close the gaps between the segments in certain of these known toothbrushes either by a corresponding shaping of the segments or by filling with a different plastics component. These constructions are extremely complicated from the manufacturing standpoint and have a limited fatigue strength. In addition, gaps and depressions are accepted in these known constructions or such depressions and hard edges cannot be avoided for manufacturing reasons. Thus, they neither meet the use requirements, nor the hygienic requirements.

The same applies regarding the proposals known from (13) to (16), in which either the entire brush head is hinged to the handle or the bristle arrangement is subdivided into individual segments and even individual bristle bundles, which are mounted in a hinged manner on the brush body.

The problem of the invention is to provide a toothbrush of the above mentioned kind which are known from (2), which is constructed in such a way that the brush head is adapted in optimum manner particularly to the problem areas of the denture, namely the inner contour thereof with varying radius of curvature.

SUMMARY OF THE INVENTION

According to a first embodiment, this problem is solved in that the bristle carrier comprises two, longitudinally successively arranged portions interconnected without transition and made from materials having different characteristics and at least the front portion is formed from an elastomer and that the materials, cross-sections and bending length of the portions are chosen in such a way that the front portion is deflectable with a smaller radius of curvature than the other portion.

As a result of the inventive construction, it is firstly possible to avoid any segmentation of the brush bead, as well as any hinged connections between the brush head parts. The brush head forms a single entity, but has a differentiated bending behavior over its length, in that the elastomer, front portion in the case of a smaller contact pressure and/or a greater curvature of the denture contour gives way more strongly than the other portion of the brush head, whose deflection occurs with a stronger contact pressure and/or a reduced curvature of the denture contour, so that all the tooth faces, also on the inner contour of the teeth, are reached by the bristles with an approximately uniform pressing action.

The two portions of the brush head can be integrally joined, e.g. by welding, two-component injection molding, etc. Preferably, both portions are made from an elastomer with different rubber elasticity.

Another solution of the problem of one invention, which can optionally be combined with the first mentioned solution, consists of the bristle carrier comprising at least two portions passing, without transition, into one another, whereof the handle-near portion tapers at a wedge angle $\beta$ to the transitionless connected front portion which itself tapers at a wedge angle $\alpha$ to the end of the brush head, in which $\alpha<\beta$.

As a result of the differing wedge angles of the two portions of the bristle carrier, there are correspondingly differing cross-sections or moments of inertia, which lead to a differing degrees of deflection of the two portions, but to a continuous deflection within each portion.

The last-mentioned embodiment can be optimized in that the bristle carrier tapers from the handle-near area to the end of the brush head, accompanied by a continuously decreasing wedge angle. Thus, the back forms a surface continuously curved from the handle-near area with a relatively large cross-section to the front end and with a minimum bristle carrier cross-section at the front end.

To ensure a completely satisfactory guidance of the brush head, the handle-near portion is connected to the handle via a comparatively less resilient, short portion.

If between the handle and the brush head, as is frequently the case in toothbrushes, there is an elastically resilient neck reduced in cross-section compared with said two parts, said neck passes with a continuously increasing cross-section of lower bending elasticity into the handle-near brush head portion.

As a result of the bending elastic neck the entire brush head can be deflected with respect to the handle, e.g. in order to be able to avoid excessive pressure in substantially planar contours of the denture. Due to the larger cross-section in the transition area between neck and elastic brush head portion, a transverse elasticity is avoided in this area, which would make the brush head guidance more difficult.

The brush head can be positively and interchangeably fixed to the handle, but can also obviously be positively connected thereto. The interchangeable fixing offers the advantage that the brush head can be replaced in the case of bristle wear, which is desirable at relatively short intervals for hygienic and dental reasons.

If the front portion is made from elastomer, it is also advantageous for it to embrace the handle-near portion with narrow strips forming the narrow sides of the brush head, so that an elastic layer, which serves as a mucosa protection, is also obtained in this harder area of the brush head.

In a further embodiment the elastomer of the front portion extends as a layer at least under the handle-near portion or optionally up to the underside of the neck. Thus, all surfaces of the toothbrush coming into contact with the gingiva during use are rubber-elastic.

This embodiment further enables to fix all bristles of the brush head in the elastomeric parts of the brush head for example by welding, melting in or molding in. All bristles or bundles can be fixed in one single processing step and are secured under the same conditions so that the draw-off strength is the same with each bristle or bundle. As the bristles or bundles respectively are fixed with their ends in the flexible elastomer, these ends can reciprocate to a certain degree so that the contact pressure is additionally controlled.

According to another embodiment the bristle carrier can be concave curved in continuous or discontinued manner to the bristles, so that in the pressureless starting position an adaptation to the convex outer contour of the denture is possible.

The envelope enclosing the ends of the bristles can essentially be a plane, it being possible for the bristle ends within a bundle or individual bundles or groups of bundles to project or be set back with respect to said envelope, in order to obtain an optimum action on the tooth surface and in the inter-dental spaces.

Instead of this the envelope enclosing the ends of the bristles can be continuously or discontinuously concavely curved to the bristles and preferably the bristles or bundles have in the front portion of the brush head a length increasing towards its end. This also permits an optimum adaptation to the outer contour of the denture.

The invention is described in greater detail hereinafter relative to embodiments and the attached drawings, wherein show:

BRIEF DESCRIPTION OF THE DRAWING

FIG. 1 A side view of a toothbrush with the brush head in section.

FIG. 2 A plan view of the toothbrush of FIG. 1.

FIG. 3 A view of the toothbrush corresponding to FIG. 1 in a use position.

FIG. 4 A broken away view of the brush head.

FIG. 5 A representation corresponding to FIG. 1 of the toothbrush in another embodiment.

FIG. 6 A section through the brush head in another variant.

FIG. 7 A plan view of the brush head in a further variant.

FIG. 8 A view of the brush head in a variant modified compared with FIGS. 1 and 5.

FIG. 9 A representation corresponding to FIG. 8 of a third embodiment of the brush head.

FIG. 10 A side view of the toothbrush in another embodiment.

FIG. 11 An underside view of the toothbrush shown in FIG. 10.

DESCRIPTION OF THE PREFERRED EMBODIMENT

The toothbrush according to FIG. 1 comprises an ergonomically shaped, substantially rigid handle or grip 1, a bending elastic neck 2 connected thereto and a brush head 3, which tapers to a rounded end 4 in the drawing plane of FIG. 2. The handle 1, which is preferably made from a rigid plastic, can have on its top and bottom handle rests 5, 6, which are e.g. from an elastomer. In the tapered neck 2 can be inserted a spring 7 determining the bending elasticity and which is made from a plastics material having a different modulus of elasticity to the plastics material surrounding it.

The neck 2 has at the transition 8 to the brush head 3 an increasing cross-section, so that the transition area 8 is substantially rigid. The brush head 3 has a bristle carrier, which comprises a front portion 9 with the rounded end 4 and a handle-near portion 10, whereof at least the former and preferably both are made from an elastomer. As can be gathered from FIG. 1, the longitudinal cross-section of the brush head 3 tapers in wedge-shaped manner towards the free end 4. On the planar underside of the brush head 3 are provided bristles in the form of bundles 11, which are so fixed by welding, molding in, etc., that their ends are located on a planar envelope.

The elastomers forming the front portion 9 and the handle-near portion 10 of the bristle carrier, as well as the length of these portions towards the longitudinal axis and the cross-sectional configuration are so selected that on using the toothbrush the brush head undergoes the deflection shown in FIG. 3 on the inner contour of the denture, i.e. the front portion 9 is bent with a smaller radius of curvature than the handle-near portion 10, as is indicated in FIG. 4 by the radii $R_1$ and $R_2$.

In the embodiment of FIG. 5, the brush head 3 is slightly concavely curved towards the bristle bundles 11, so as to bring about in the pressureless starting position an adaptation to the outer contour of the denture, in which the ends of the bristle bundles are located on a corresponding concave envelope. Otherwise, the structure of the brush head corresponds to that of FIG. 1.

In place of the integral joining of the brush head 3 to the transition area 8 of the neck 2 shown in FIGS. 1 and 5, the brush head 3, as shown in FIG. 6, can be fixed positively and interchangeably to the neck 2.

In the embodiment of FIG. 7 the front portion 9 made from the softer elastomer engages over the handle-near portion 10 at the narrow sides of the bristle head with strips 12, which consequently form an effective mucosa protection over almost the entire longitudinal extension of the brush head.

In the embodiment of FIG. 8 the brush head 2 is molded in one piece from a bending elastic plastics material. It once again has a wedge-shaped longitudinal cross-section, the handle-near portion 10 having a wedge angle β and the front portion 9 a wedge angle α. The wedge angle α is smaller than the wedge angle β, so that there is a bending elasticity varying from the handle-near area to the front end with a greater elasticity in the vicinity of the front portion 9.

In place of the discontinuity resulting from the different wedge angles in the embodiment of FIG. 8, the wedge angle of the brush head can also change in continuously decreasing manner from the handle-near area to the front end 4, so that for a given pressing action an increasing of deflection of the brush head 3 occurs from its handle-near area to the end 4.

It is obvious that the embodiments of FIGS. 8 and 9 can also be combined with those of FIGS. 1 and 5, e.g. the wedge angles or their configuration can also be implemented with the elastomer portions 9 and 10.

In the embodiment of FIGS. 10 and 11 the elastomer of the front portion 9 extends under the handle-near portion 10 in the form of a layer 13. The upper part of the handle-near portion 10 may consist of the same plastic material as the neck 2 and the grip 1 but has a less thickness so that it is able to bend together with the layer under the contact pressure of the bristles. The bundles 11 are exclusively fixed to the elastomeric parts 9, 13 of both portions 9, 10 for example by welding, melting in or molding in. The layer may also extend up to the underside of the neck 2.

PRIOR ART PUBLICATIONS (1) U.S. Pat. No. 1,327,807 (Burleigh)
(2) U.S. Pat. No. 2,445,657 (Bennett)
(3) U.S. Pat. No. 5,373,602 (Bang)

(4) U.S. Pat. No. 2,631,320 (Bressler)
(5) U.S. Pat. No. 4,691,405 (Reed)

(6) WO 92/17092 A (Lingner & Fischer)
(7) EP 0 577 656 B1 (SmithKline Beecham)
(8) WO 97/07707 A (SmithKline Beecham)
(9) WO 97/20484 A (Unilever)
(10) WO 97/24048 A (Colgate-Palmolive)
(11) WO 97/25899 A (The Procter & Gamble)

(12) WO 97/25900 A (The Procter & Gamble)
(13) DE 297 00 207 U1 (SmithKline Beecham)
(14) U.S. Pat. No. 4,330,896 (Booth)
(15) WO 92/17094 A (Bradley)
(16) DE 195 38 569 A (Coronet)

I claim:

1. A plastic cleaning brush comprising:

a handle;

a front bristle carrier portion having a longitudinal cross section tapering towards a front end thereof, said front portion made from an elastomer;

a rear bristle carrier portion, connected between said handle and said front portion, said rear portion joined, without transition, to said front portion, said rear portion having a longitudinal cross-section tapering towards said front portion, wherein said rear portion is made from an elastomer; and bristles mounted to said front and said rear portions, wherein materials, cross-sections and bending lengths of said front and said rear portions are selected such that, when a pressure exercised by said bristles on a surface to be cleaned exceeds a given value, said front portion elastically deflects with a radius of curvature $R_1$ and said rear position elastically deflects with a radius of curvature $R_2$, wherein $R_1$ is less than $R_2$.

2. The cleaning brush of claim 1, wherein said front and rear portion are integrally joined together.

3. The cleaning brush of claim 1, wherein said rear portion has a thickness which tapers, with a wedge angle β, towards said front portion, and wherein said front portion has a thickness which tapers, with a wedge angle α, towards a free end of the brush, wherein α<β.

4. The cleaning brush of claim 1, wherein said front and said rear portions have thicknesses which taper from said handle towards a free end of the brush under a continuous, decreasing wedge angle.

5. The cleaning brush of claim 1, wherein said handle comprises a short portion connected to said rear portion, said short portion having a flexibility which is less than a flexibility of said rear portion.

6. The cleaning brush of claim 5, wherein said handle comprises an elastic, flexible neck connected to said short portion, said neck having a cross-section which is less than a cross-section of said rear portion, wherein said short portion has a cross-section of reduced elasticity which constantly increases towards said rear portion.

7. The cleaning brush of claim 1, wherein said rear portion is positively and interchangeably fixed to said handle.

8. The cleaning brush of claim 1, wherein said front portion comprises narrow strips forming narrow sides of a cleaning brush head, said narrow strips engaging about said rear portion.

9. The cleaning brush of claim 1, wherein elastomeric material of said front portion extends as a layer at a lower side of said rear portion.

10. The cleaning bush of claim 9, wherein said layer extends up to a lower side of said handle.

11. The cleaning brush of claim 1, wherein all of said bristles are fixed in elastomer.

12. The cleaning brush of claim 1, wherein said front and said rear portions are one of continuously and discontinuously concave curved in a direction facing said bristles.

13. The cleaning brush of claim 1, wherein an envelope enclosing ends of said bristles is planer.

14. The cleaning brush of claim 1, wherein an envelope enclosing ends of said bristles is one of continuously and discontinuously concave curved.

15. The cleaning brush of claim 14, wherein said bristles have a length increasing towards a free end o said front portion.

* * * * *